Patented May 25, 1937

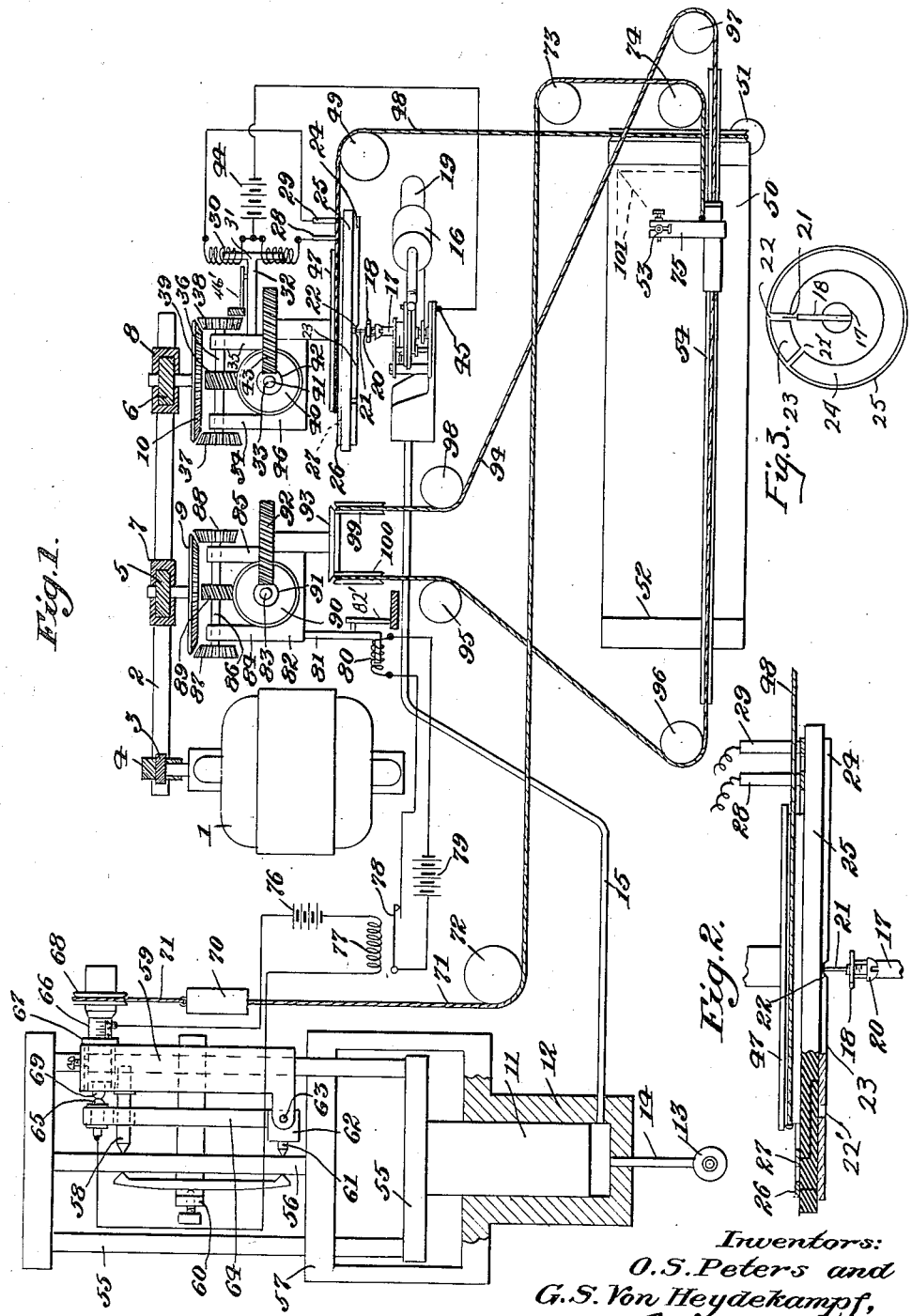

2,081,598

UNITED STATES PATENT OFFICE 2,081,598

RECORDING TESTING MACHINE

Orville S. Peters, Chevy Chase, Md., and Gerd S. von Heydekampf, Ridley Park, Pa., assignors to Baldwin-Southwark Corporation, Philadelphia, Pa., a corporation of Delaware Application January 16, 1932, Serial No. 587,064

16 Claims. (Cl. 265—2)

Our invention relates to a stress and strain recorder and more particularly to a testing machine in combination with a means for graphically recording variations in stress applied to a specimen under test, as well as the resulting variations in strain in the specimen.

The instrument to which these specifications apply is designed to operate with the hydraulic type of testing machine. In this type of testing machine, hydraulic pressure is introduced into a cylinder containing a piston which applies stress to a specimen through the medium of suitable yokes and grips. It also operates with testing machines in which the load is sustained by means of a hydraulic cell or support. In either case, the load applied to the specimen bears a direct relation to the hydraulic pressure which can be measured with a pressure gage.

The object of our invention is to provide in a testing machine an electromechanical means whereby a curve tracing device may be made to draw a line in two coordinates on a sheet of paper, one coordinate to be in proportion to the hydraulic pressure, which is a measure of the stress applied, and the other coordinate in proportion to the strain produced in the specimen. The resulting curve indicates the stress-strain relation, and from it may be deduced the elastic modulus, proportional limit, and yield point.

We attain this object and the results set forth by means of the apparatus shown in the accompanying drawing, wherein—

Figure 1 is a plan view of the apparatus, more or less schematic, showing the parts in their cooperative relation; and Fig. 2 is an enlarged detail view of an electrical follow-up device.

Fig. 3 is a reduced side elevational view of a detail.

Referring to the drawing in detail, an electric motor 1 is adapted to drive a shaft 2 through the reducing gears 3 and 4. On the shaft 2 are secured worms 7 and 8 which operate worm gears 5 and 6, to the shafts of which are secured bevel gears 9 and 10. Thus with the motor 1 continuously in operation, bevel gears 9 and 10 are continuously in rotation, the object being to supply power to the recording devices when required.

A piston 11 is arranged to slide in a hydraulic chamber 12 within which the pressure may be varied by means of the pump 13, which introduces fluid into the chamber 12 through the pipe 14. From the chamber 12 a tube 15 leads to a pressure gage mechanism 16 of the Bourdon tube type, upon the shaft 17 of which is mounted a hand 18 which rotates with the shaft 17 as the pressure within the Bourdon tube 19 changes. The hand 18 carries at its outer end a screw 20 with a metal whisker 21 affixed thereto.

The whisker 21 in its normal position rests without touching within a gap 22 in a segmental metal ring consisting of two segments 23 and 24, separated by gaps 22 and 22', but is so constructed that in the event of a sudden movement of the hand 18 it can ride up on either segment 23 or 24. The segments 23 and 24 are secured to and are concentric with a disk of insulating material 25, and are also concentric with the axis of rotation of hand 18 so that whisker 21 is in contact with either segment 23 or 24 at all parts of its travel except while in the gap 22 and the corresponding gap at the opposite end of segment 24. Disk 25 carries on its back two continuous metal rings 26 and 27, arranged concentrically and secured to the disk 25 so as to rotate with it. Ring 26 is connected electrically to segment 23, and ring 27 to segment 24. In contact with the rings 26 and 27 are two metallic brushes 28 and 29 which lead to the coils of a double acting solenoid 30. The armature 31 of the solenoid is secured to a lever 32 which actuates a yoke 46 which is rotatable about the center 33. Yoke 32 carries in bearings 34 and 35 a shaft 36 upon which are mounted bevel gears 37 and 38 which, when engaged with the bevel gear 10, rotate therewith in one direction or the other, depending upon which gear is engaged.

Mounted upon shaft 36 is spiral gear 39 which engages with spiral gear 40, upon the shaft 41 to which is secured worm 42 which engages worm wheel 43, which in turn is secured upon the shaft of the disk 25 and rotates therewith.

The operation of this portion of the apparatus which records the pressure coordinate is as follows: A pressure change in the chamber 12 is accompanied by a rotation of the hand 18 which brings the whisker 21 in electrical contact with either segment 23 or 24, depending upon whether the pressure change is an increase or a decrease. This operation energizes the corresponding side of solenoid 30 through the medium of the battery 44 which is connected to the mid-point of the solenoid winding and to the frame of the pressure gage 16 at 45. When one side of the solenoid 30 is energized, the armature is drawn in, and through lever 32 and yoke 46, which rotates about center 33, bevel gear 37 is engaged with bevel gear 10. The rotation of bevel gear 10 is thereby transmitted through the medium of spiral gears 39 and 40, worm 42 and worm gear 43 to the disk 25, which thereby tends to rotate in the same direction as hand 18 and break the contact between the whisker 21 and segment 23 or 24. This break in contact releases solenoid 30 and causes bevel gear 10 to become disengaged. As the pressure in chamber 12 increases or decreases, the hand 18 and disk 25 will rotate together with a degree of hunting which may be controlled by the width of the gap 22.

On increasing pressure, the hand 18 is preferably made to rotate in a counter-clockwise direction, or towards segment 23, which is made less than one-fourth of the total circumference of rotation of hand 18. Segment 24 is correspondingly made greater than three-fourths of the circumference. The reason for this is that, as commonly constructed, Bourdon tube type pressure gages show a rotation of three-fourths of a complete circle on full pressure. Thus if hand 18 is rotated to three-fourths of a circle and the pressure is suddenly released, the return rotation does not carry whisker 21 beyond segment 24, but remains in contact with it to energize solenoid 30 on the opposite side to cause gears 10 and 38 to mesh to bring the disk 25 back to its initial position.

At the back of disk 25 is affixed a pulley 47 to which is attached one end of a cord 48 which passes around a pulley 49 and over a groove in a rotatable drum 50 to a weight 51 which is suspended under the action of gravity. Since the cord 48 is under constant tension from the weight 51, it places disk 25 and drum 50 in exact rotational relation with each other. Thus as disk 25 follows hand 18 in direct relation to the pressure in chamber 12, it draws drum 50 with it in exact rotational relation therewith through the medium of the cord 48. If a sheet of paper 52 be affixed to the drum, and a pencil 53 be affixed to a pencil carriage 75 with its point resting on the paper 52, a line will be drawn on the paper which in length circumferentially to the drum 50 will be in direct ratio to the pressure in the chamber 12.

As the pressure changes, more or less force is exerted on the piston 11, which in turn through a movable frame 55 is transmitted to a specimen 56, which is affixed at its ends to the frame 55 and to the stationary frame 57.

The application of force to the specimen 56 causes it to elongate in accordance with well known physical laws. A sharp metallic point 58 fixed in frame 59 is forced into the specimen 56 and engaged therewith by means of a clamp 60. A sharp metallic point 61 fixed in block 62 is likewise forced into the specimen and engaged therewith by the clamp 60. The block 62 and frame 59 are rotatably engaged by means of trunnions 63. To block 62 is affixed an arm 64 which carries at its outer end an insulated electrical contact point 65. At the upper end of the frame 59 is mounted a micrometer screw head 66 in an insulating bushing 67, and carrying on its rotatable sleeve a fixed pulley 68. At the inner end of the head 66 is mounted a second electrical contact point 69 axially in line with the contact 65.

A weight 70 is attached to a cord 71 to maintain the cord at constant tension over the pulley 68 and around pulleys 72, 73 and 74. The end of the cord 71 is attached to a pencil carriage 75 which is movable longitudinally upon rod 54.

From contacts 65 and 69 insulated wires lead to a battery 76 and a relay 77, which, when energized, opens the contact 78. Contact 78 is in series with a battery 79 and solenoid 80. The armature of solenoid 80 is affixed to a lever 81, which in turn is affixed to a yoke 82 which is rotatable about the center 83 and carries in bearings 84 and 85 a shaft 86 to the ends of which are affixed bevel gears 87 and 88. Shaft 86 carries a spiral gear 89, which engages with a spiral gear 90 on the shaft of which is mounted a worm 91 which engages with a worm gear 92. The shaft of worm gear 92 carries pulley 93. Ordinarily, each bevel gear 37, 87 etc. after contacting a gear 9 or 10 will be pushed out of mesh by the gear 9 or 10 when a related solenoid 30 or 80 is deenergized although, in actual practice, it is preferred to use springs 82' and 46' to return the yokes to neutral. The gear 88 can be used to reverse the direction of drive for the carriage 75. When it is desired to reverse the drive to the carriage 75, the yoke 82 may be moved manually to cause gears 9 and 88 to mesh.

Means for transmitting power for relatively moving the chart and marker elements in either of opposite directions includes an endless cord 94 passed around the pulley 93, and also around pulleys 95, 96, 97, 98, 99 and 100 to pencil carriage 75, to which it is affixed, so that if the cord moves the pencil carriage moves with it by sliding on rod 54, about which rod the pencil rotates so the point of pencil 53 may rest on paper 52.

The operation of this portion of the apparatus is as follows: As pressure in the chamber 12 increases, piston 11 moves upward increasing the separation between frames 55 and 57 and applying force to the specimen 56 which elongates, a portion of the elongation taking place between the points 58 and 61. The result of this elongation is to rotate the block 62 and arm 64 counter-clockwise in trunnions 63 and separate contacts 65 and 69. As the electrical circuit is thus broken, relay 77 is de-energized permitting contact 78 to close and energize solenoid 80 from battery 79. The armature of solenoid 80 is thus drawn in, rotating yoke 82 clockwise through lever 81 around the axis of shaft 83 and engaging gears 9 and 87 which, through the medium of spiral gears 89 and 90 and worm 91 and worm gear 92, causes pulley 93 to rotate and move the pencil carriage 75 through the medium of cord 94. As the pencil carriage 75 moves, it carries with it the cord 71 which rotates the pulley 68 and causes the micrometer screw head 66 to advance and close the gap between contacts 65 and 69. As this occurs, relay 77 is energized, opening contact 78 and releasing solenoid 80 which permits gears 9 and 87 to become disengaged, thus stopping the pencil carriage 75. From the foregoing it is seen that the gears 9, 87 and 88 constitute clutch or connecting means between the power operated shaft 2 and the transmiting means 93, 94, etc. above referred to.

Thus, as the elongation between points 58 and 61 proceeds, the contacts 65 and 69 are alternately separated and closed and the pencil carriage 75 is moved in steps in a direction parallel to the axis of the drum by an amount which bears a direct relation to the elongation of specimen 56 in the portion between points 58 and 61. The pressure change in chamber 12 which acts to produce this elongation is communicated to drum 50 in the manner described heretofore, causing drum 50 to rotate proportionally, thus combining the two motions to draw a single line 101, the coordinates of which circumferentially to the drum are proportional to the pressure, and longitudinally are proportional to the elongation in specimen 56 between the points 58 and 61.

By proper mechanical refinements, the steps in both directions are reduced to such small amounts for each period of operation of the device that the resultant appears to be a smooth curve. The smoothness of operation is greatly enhanced by arranging the circuits and mechanism so the power from the motor 1 tends to raise the weights 51 and 70 against the action of gravity with increasing pressure in chamber 12 and increasing elongation in specimen 56.

For a complete understanding of the invention, we have disclosed a preferred modification thereof. It is to be understood, however, that variations and equivalents are contemplated such as will be embraced within the scope of the claims which follow.

What we claim is:—

1. Apparatus for recording physical characteristics of a test specimen stressed in a materials testing machine comprising, in combination, a recorder drum, a marker associated with said drum, a cable for rotating said drum, driving means for said cable, means progressively movable in one direction in response to increase in specimen load for controlling said driving means, a second cable for moving said marker, driving means therefor, and means operably responsive to variations in distortion of the specimen for controlling said last named driving means.

2. Apparatus for recording physical characteristics of a test specimen stressed in a materials testing machine comprising, in combination, a recording chart, a chart marker, pressure responsive means progressively movable in one direction in response to increases in load applied to a specimen, a contact movable by said pressure responsive means, a movable contact associated with said first-named contact, a circuit controlled by said contacts, and means responsive to energization of said circuit for moving said chart and marker relatively and causing said contacts to separate.

3. Apparatus for recording physical characteristics of a test specimen stressed in a materials testing machine comprising, in combination, a movable recording chart, pressure responsive means movable in response to variations in specimen load, a contact progressively movable by said pressure responsive means during increases of load, a second contact cooperatively associated with said movable contact, a circuit controlled by said contacts, and means responsive to energization of said circuit for moving said chart, including means to effect relative movement between said contacts to break said circuit whereby to provide a follow-up device for controlling chart movements.

4. Apparatus for recording physical characteristics of a test specimen stressed in a materials testing machine comprising, in combination, relatively movable chart and marker elements, a contact, means for moving said contact progressively in one direction in response to successive increases of specimen load, a cooperating contact, a circuit controlled by said contacts, and means adapted upon control of said circuit by said contacts to relatively move said chart and marker and simultaneously shift said cooperating contact to provide a follow-up action, thereby to graphically record stress increments.

5. Apparatus for recording physical characteristics of a test specimen stresed in a materials testing machine comprising, in combination, a relatively movable chart and marker, power operated driving means, a plurality of clutches associated with said driving means, means for relatively moving said chart and marker upon engagement of any one of the clutches, means responsive to variations in specimen strain for causing engagement of certain of said clutches, and means responsive to both increases and decreases in specimen load for causing engagement of other of said clutches.

6. Apparatus for recording physical characteristics of a test specimen stressed in a materials testing machine comprising, in combination, relatively movable chart and marker elements, continuously operating power means, a pair of clutches, means for relatively moving said chart and marker elements in either one of opposite directions upon engagement of one or the other of said clutches with said power means, and means responsive to increases and decreases in specimen load for causing alternative engagement of said clutches.

7. Recording apparatus for a test specimen stressed in a materials testing machine comprising, in combination, relatively movable chart and marker elements, power means, power transmitting means for moving one of said elements, clutch means for connecting said transmitting means to said power means, an electrical circuit including contacts which are closed or opened in response to variations in strain of the specimen, means responsive to making or breaking of said contacts for operating said clutch means thereby to record variations in strain, a second power transmitting means for moving the other element in either of opposite directions, a second clutch means for connecting said second transmitting means to said power means, and means responsive to increases and decreases in specimen load for operating said second clutch means to effect either of said opposite movements in accordance with increases and decreases in load and accordingly record the same.

8. Recording apparatus for a test specimen stressed in a materials testing machine comprising, in combination, relatively movable chart and marker elements, a continuously operating driving toothed gear, power transmitting means for effecting said relative chart and marker movement including a driven toothed gear, means for relatively shifting said driving and driven gears so as to throw the same into or out of mesh with each other, and means for effecting said shifting movement automatically in accordance with specimen load.

9. The combination set forth in claim 8 further characterized in that said power transmitting means also includes continuously meshed gears connected for rotation with said driven gear, and said shifting means includes a frame for supporting one of said meshed gears and said driven gear for bodily movement as a unit to effect said shifting operation.

10. Recording apparatus for a test specimen stressed in a materials testing machine comprising, in combination, relatively movable chart and marker elements, a continuously operable driving gear, power transmitting means for effecting said relative chart and marker movement in either of opposite directions including a pair of driven gears adapted respectively for alternative engagement with said driving gear on opposite sides of its axis, and means responsive to increases and decreases in specimen load for effecting said alternative gear engagement thereby to record both of such variations in specimen loads.

11. Apparatus for recording physical characteristics of a test specimen stressed in a materials testing machine comprising, in combination, a chart and marker adapted for relative movement, an electrical circuit having a contact, means for rotating said contact in one or the other of two directions in response respectively to increases and decreases in specimen load and a second rotatable contact adapted for cooperation with said other contact, a source of power, and means controlled by said circuit and operated by said power for effecting said relative chart and marker movement and for moving said second contact to provide a follow-up action between said contacts.

12. Apparatus for recording physical characteristics of a test specimen stressed in a materials testing machine comprising, in combination, a movable load recording element, a circuit controlled by cooperating electrical elements progressively movable in the same direction, means for moving one of the same in response to load, and power operated means controlled by said circuit for moving both said recording element and said other electrical element to provide a follow-up action between said electrical elements.

13. Apparatus for recording physical characteristics of a test specimen stressed in a materials testing machine comprising, in combination, a movable load recording element, relatively movable cooperating electrical elements progressively movable substantially together in either one of opposite directions, means whereby said electrical elements are adapted to maintani cooperation for a greater extent of relative movement in one of said directions than in the other, means for progressively moving one of said electrical elements in either one of opposite directions in response respectively to increasing or decreasing values of a physical characteristic of a specimen, means for moving the other of said electrical elements upon occurrence of movement of said recording element to provide a follow-up action, a circuit controlled by said electrical elements, and power means controlled by said circuit for moving said recording element.

14. Apparatus for recording physical characteristics of a test specimen stressed in a materials testing machine comprising, in combination, a relatively movable chart and marker, a rotatable element having arcuate contacts with a space between their adjacent ends, a contact normally disposed within said space and operable in response to a predetermined physical characteristic of the specimen, a circuit controlled by said contacts, and means controlled by said circuit for effecting said relative movement between the chart and marker and for moving said rotatable element to effect a restoring action between said arcuate contacts and other contact.

15. The combination set forth in claim 14 further characterized in that said arcuate contacts are segments of different lengths, the shorter one of said contacts being for increases of load on a specimen and the longer one of said contacts being for decreases in load.

16. Apparatus for recording physical characteristics of a test specimen stressed in a materials testing machine comprising, in combination, relatively movable chart and marker elements, continuously operating power means, power transmitting means for relatively moving said elements in either of opposite directions, means for connecting said transmitting means to said power means to effect said opposite movements, and means responsive to said characteristic for operating said connecting means to effect said opposite relative movements in accordance with increasing or decreasing values of the characteristic.

ORVILLE S. PETERS.
GERD S. von HEYDEKAMPF.